A. MULDER.
MILK BOTTLE.
APPLICATION FILED JULY 23, 1910.
1,017,161. Patented Feb. 13, 1912.
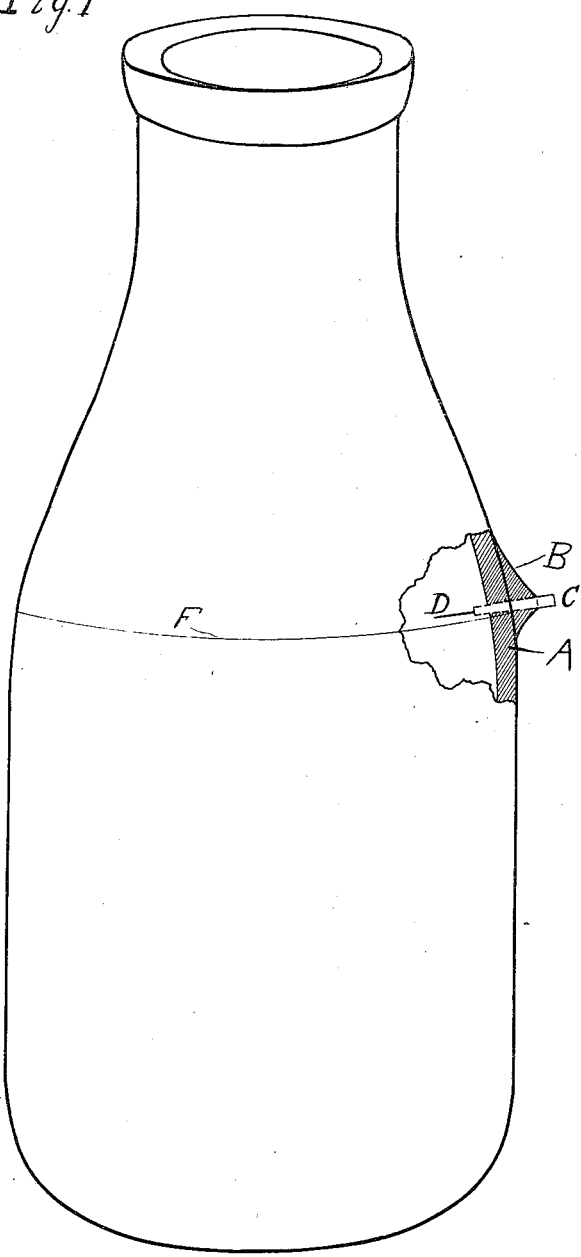
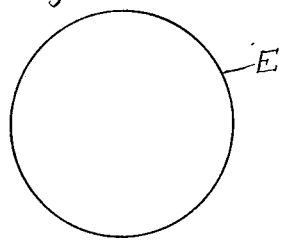
Witnesses
John Riordan
John P. Walsh
Inventor
Alje Mulder

UNITED STATES PATENT OFFICE.

ALJE MULDER, OF GRAND RAPIDS, MICHIGAN.

MILK-BOTTLE.

1,017,161.     Specification of Letters Patent.     Patented Feb. 13, 1912.

Application filed July 23, 1910. Serial No. 573,583.

*To all whom it may concern:*

Be it known that I, ALJE MULDER, a citizen of the United States, and a resident of the city of Grand Rapids, in the county of Kent and State of Michigan, have invented certain new and useful Improvements in Milk-Bottles; and I do hereby declare that the following is a full, clear, and exact description of the same.

This invention relates to the improvement in milk bottles used in supplying and delivering milk to the trade.

The object of this invention is to manufacture a milk bottle which, by its construction, will indicate the richness of milk, from which may be drawn the cream when separated in the bottle. I have for this purpose a bottle of the regular form provided with a side neck, opening through the wall of the bottle. For this side opening I have a stopper provided with a pin at one end. This stopper may be made of glass or wood or any material suitable for that purpose.

Figure 1 is a perspective view of a bottle with parts broken away. Fig. 2 is a side elevation of the stopper and pin. Fig. 3 is a plan view of the sealing disk.

"A" is the bottle; "B" is the side neck; "C" is the stopper; "D" is the pin; "E" is a paper wafer; same to be used for closing the bottle at top in the usual way.

A bottle of this size and form when filled, with a good quality of milk and when separated in the bottle will show a dividing line F of cream from milk at a point four inches (4″) from the top and as the side neck opening is just at this point, it may be observed if the required cream is at the top. The cream out of this bottle may be drawn off without opening the top closure which is a decided improvement from a sanitary standpoint.

The operation is very simple, namely: Place the bottle on a table, then put a pitcher under the side neck—2nd take out the stopper—3rd punch a hole through the wafer with a pin and the cream on top of the milk will flow out into the pitcher without opening the top closure, which prevents insects or flies to settle in the bottle.

This bottle will fill a long felt want as many families use cream at the breakfast table for the milk delivered in the morning shows most of the time that separation has taken place. The result thus obtained shows that the milk was produced the night before and kept on ice by the dealer until delivery is made.

This bottle can be manufactured very cheaply, for almost the same cost as the ordinary one neck bottle and will, therefore, be of service to the poor as well as the rich. It will also be a great aid to the sick and infants as physicians often prescribe pure cream and sometimes skimmed milk and this invention will serve both purposes.

I am aware that it is not a new idea to put an opening in the side of a bottle or other receptacle and I don't make a claim for it. But, as it is universally known for the past ten years that the majority of milk users want a milk bottle from which they could pour the separated cream without mixing it again with the milk, there must be a desire for a bottle as above described which would be cheap and sanitary.

My claim is as follows:

In combination with a bottle having a discharge opening in the top thereof and a relatively small discharge opening in the side thereof, said latter opening being approximately at the cream line, a paper wafer seal for the top opening and a combined plug stopper and pin for the side opening, said pin being permanently attached to the stopper and adapted to be removed from the bottle therewith and to puncture the paper wafer, thereby providing a vent.

This specification signed and witnessed this 21st day of July 1910.

ALJE MULDER.

Witnesses:
JOHN RIORDAN,
JOHN P. WALSH.